United States Patent
Jain et al.

(10) Patent No.: US 10,530,750 B2
(45) Date of Patent: Jan. 7, 2020

(54) FIREWALL POLICY ENFORCEMENT BASED ON HIGH LEVEL IDENTIFICATION STRINGS

(71) Applicant: Nicira, Inc., Palo Alto, CA (US)

(72) Inventors: Jayant Jain, Cupertino, CA (US);
Kausum Kumar, Los Gatos, CA (US);
Anirban Sengupta, Saratoga, CA (US);
Rick Lund, Pleasanton, CA (US);
Jingmin Zhou, Los Gatos, CA (US)

(73) Assignee: NICIRA, INC., Palo Alto, CA (US)

( * ) Notice: Subject to any disclaimer, the term of this patent is extended or adjusted under 35 U.S.C. 154(b) by 299 days.

(21) Appl. No.: 15/378,313

(22) Filed: Dec. 14, 2016

(65) Prior Publication Data
US 2018/0167363 A1    Jun. 14, 2018

(51) Int. Cl.
*H04L 29/06* (2006.01)
(52) U.S. Cl.
CPC ...... *H04L 63/0263* (2013.01); *H04L 63/0218* (2013.01)
(58) Field of Classification Search
CPC .......... H04L 63/0218; H04L 63/0263
See application file for complete search history.

(56) References Cited

U.S. PATENT DOCUMENTS

| | | | |
|---|---|---|---|
| 7,849,502 B1* | 12/2010 | Bloch | H04L 29/12066 726/11 |
| 2007/0033645 A1* | 2/2007 | Jones | H04L 29/12009 726/12 |
| 2015/0326530 A1* | 11/2015 | Wood | H04L 29/06 726/11 |
| 2015/0341318 A1* | 11/2015 | Lee | H04L 63/0218 726/11 |

* cited by examiner

*Primary Examiner* — Baotran N To

(57) ABSTRACT

The technology disclosed herein enables the enforcement of firewall policies based on high level identification strings. In a particular embodiment, a method provides receiving a first reply from a first identification system directed to a requestor system. In response to determining that the first identification system comprises an identification system trusted by the firewall, the method provides inspecting at least one packet included in the first reply to identify a first network address therein associated with a first high level identification string. The method further provides updating a data structure comprising allowed network addresses with the first network address and, after updating the data structure with the first network address, allowing at least one packet from the requestor system directed to a first destination at the first network address to traverse the firewall system based on the data structure.

18 Claims, 8 Drawing Sheets

FIREWALL POLICY ENFORCEMENT BASED ON HIGH LEVEL IDENTIFICATION STRINGS

TECHNICAL BACKGROUND

A typical network firewall uses rules for processing network traffic to determine whether the network traffic should be allowed to pass through the firewall. The rules are applied to Internet Protocol (IP) addresses of the network traffic (e.g. destination, source, next/last hop, etc.) and indicate how network traffic exchanged with certain IP addresses should be handled. For instance, the rules may be configured to allow network traffic associated with certain IP addresses to pass through the firewall, deny passage through the firewall for network traffic associated with other IP addresses, or provide more specific directions for handling traffic to/from certain IP addresses.

Enforcement based on IP addresses in the manner described above works well when IP addresses remain constant. However, some network systems may be identified by high level identification strings rather than by the IP addresses of those network systems, which allows those IP addresses to change. Likewise, the network systems themselves may change over time, as new systems may be brought online and other systems may be taken offline. Thus, even if the firewall rules were properly configured to operate on traffic exchanged with one IP address associated with a high level identification string, the firewall rules may not be configured to properly operate on other IP addresses associated with that same string.

For example, when accessing a system over the internet, such as a web server providing website content, a domain name based web address acts as a high level identification string for the system. A domain name server (DNS) system is used to translate a web address, which is typically easy for a user to remember, into one or more IP addresses for one or more systems associated with that domain name. Thus, the systems and IP addresses can change over time and still be accessible via the domain name by simply keeping the DNS system up to date. A requesting system then uses one or more of those provided IP addresses to communicate with the systems associated with the domain name. Given the dynamic nature of those IP addresses, a firewall rule may not be configured to properly handle communication traffic exchanged using the various IP addresses that could be associated with the domain name (e.g. may be denied or allowed contrary to the intentions of a firewall administrator).

Overview

The technology disclosed herein enables the enforcement of firewall policies based on high level identification strings. In a particular embodiment, a method provides receiving a first reply from a first identification system directed to a requestor system. In response to determining that the first identification system comprises an identification system trusted by the firewall, the method provides inspecting at least one packet included in the first reply to identify a first network address therein associated with a first high level identification string. The method further provides updating a data structure comprising allowed network addresses with the first network address and, after updating the data structure with the first network address, allowing at least one packet from the requestor system directed to a first destination at the first network address to traverse the firewall system based on the data structure.

In some embodiments, the method provides receiving a redirect message from the first destination directed to the requestor system, inspecting at least one packet that comprises the redirect message to identify a second network address therein, and opening an application-layer gateway session through the firewall system for at least one packet from the requestor system directed to the second network address. In these embodiments, the redirect message may comprise a Hypertext Transfer Protocol (HTTP) redirect message.

In some embodiments, updating the data structure with the first network address comprises applying a plurality of rules to the first high level identification string. The rules in these embodiments define whether communications directed to particular identification strings should be allowed. In response to determining that the first high level identification string satisfies at least one rule of the plurality of rules for allowing communications associated with the first high level identification string, the method in these embodiments provides adding the first network address to the data structure.

In some embodiments, the method provides indicating the at least one rule in the data structure along with the first network address.

In some embodiments, the method provides associating the first network address with the first high level identification string in the data structure.

In some embodiments, the method provides receiving a user defined set of trusted identification systems including the first identification system.

In some embodiments, the first identification system comprises a Domain Name System (DNS) and the high level identification string comprises a domain name.

In some embodiments, the firewall system comprises a distributed firewall having distinct instances distributed across a plurality of hypervisors executing on a plurality of host computing systems.

In another embodiment, a system is provided that includes one or more computer readable storage media and a processing system operatively coupled with the one or more computer readable storage media. Program instructions stored on the one or more computer readable storage media, when read and executed by the processing system, direct the processing system to receive a first reply from a first identification system directed to a requestor system. In response to determining that the first identification system comprises an identification system trusted by the firewall, the program instructions direct the processing system to inspect at least one packet included in the first reply to identify a first network address therein associated with a first high level identification string and update a data structure comprising allowed network addresses with the first network address. After updating the data structure with the first network address, the program instructions direct the processing system to allow at least one packet from the requestor system directed to a first destination at the first network address to traverse the firewall system based on the data structure.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The firewall implementations described below allow for the enforcement of firewall policies on high level identification strings. High level identification strings, such as domain name based web addresses, are used in place of network addresses for various reasons, including the fact that high level identification strings may be easier for a user to remember and allow the network address(es) associated with each of those strings to change. To perform high level identification string based enforcement, the firewalls herein rely on trusted identification systems that translate high level identification strings into one or more network addresses. In the case of domain names, an identification system is a DNS system while other types of high level identification string schemes may use different types of identification systems.

A trusted identification system is an identification system that the firewall implicitly trusts to provide correct network addresses in response to translation requests for network addresses associated with high level identification strings. Firewall rules can then state how to handle certain network traffic (e.g., allow, deny, etc.) based on the high level identification string. For instance, a firewall rule may indicate that network traffic associated with a particular high level identification string should be allowed to pass through a firewall. The firewall will accordingly allow network traffic exchanged using network addresses provided by the trusted identification system as being associated with the string.

Figure 1:
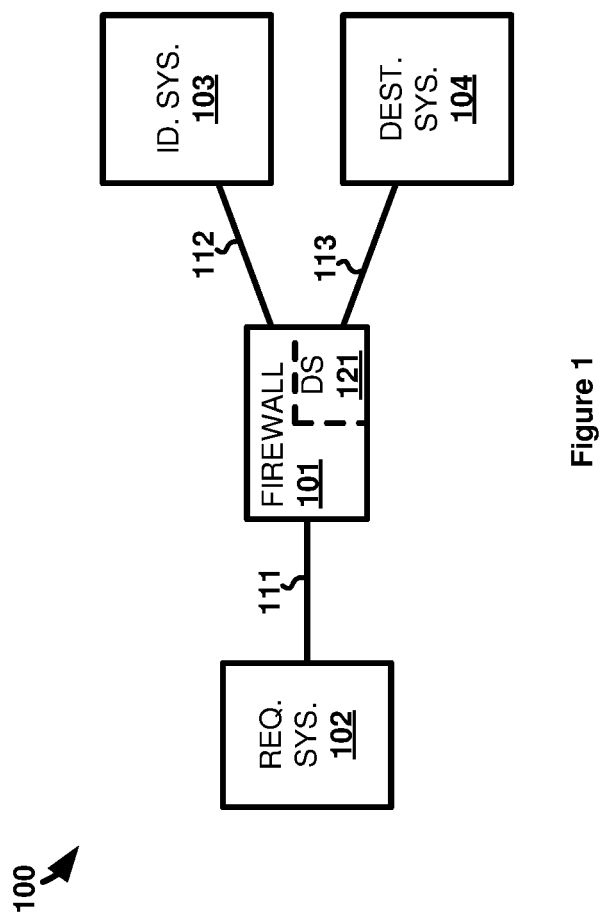
FIG. 1 illustrates a computing environment for firewall policy enforcement based on high level identification strings.

FIG. 1 illustrates computing environment 100 for firewall policy enforcement based on high level identification strings. Computing environment 100 includes network firewall 101, requestor system 102, identification system 103, and destination system 104. Elements 101-104 communicate over communication links 111-113. Network firewall 101 includes network address data structure 121 to track network addresses of applicable high level identification strings. Network address data structure 121 may be a table, list, or some other type of data structure. While network address data structure 121 is shown within network firewall 101, network address data structure 121 may be maintained in a storage location external to network firewall 101.

Figure 2:
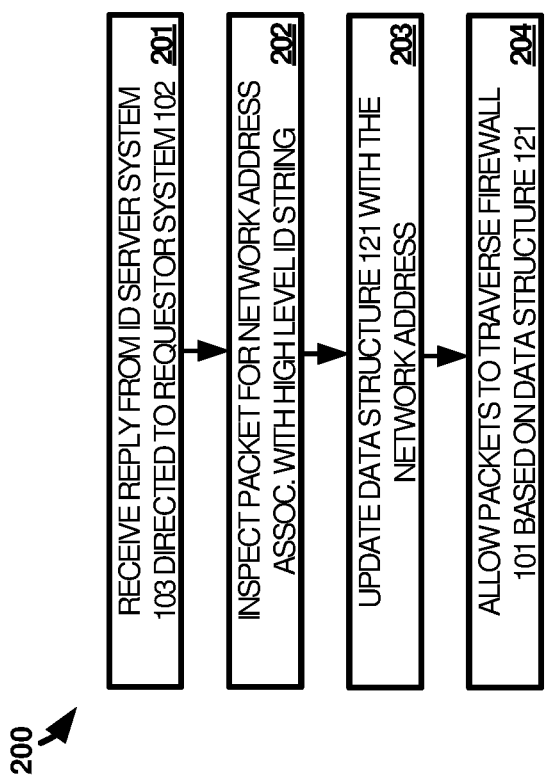
FIG. 2 illustrates a method of operating the computing environment for firewall policy enforcement based on high level identification strings.

FIG. 2 illustrates method 200 of operating computing environment 100 for firewall policy enforcement based on high level identification strings. Method 200 provides network firewall 101 receiving a reply from identification system 103 that is directed to requestor system 102 (201). The reply may be in response to a request from requestor system 102 to translate a high level identification string. The high level identification string may have been provided to requestor system 102 by a user, may be preloaded into an application executing on requestor system 102, or obtained by requestor system 102 in some other manner.

Network firewall 101 determines whether identification system 103 is an identification system that should be trusted by network firewall 101. One or more trusted identification systems may be indicated to network firewall 101 based on their respective network addresses since identification systems typically have static network addresses so that they can translate high level identification strings into network addresses that may vary. Other means for identifying trusted identification systems may also be used. The trusted identification systems may be identified by a user administrator of network firewall 101 (e.g., a list of trusted systems input into network firewall 101 or via another system in communication with network firewall 101), may be determined by each identification system's historical reputation for being trustworthy, or may be identified in some other manner.

In response to network firewall 101 determining that identification system 103 is a trusted identification system, method 200 provides network firewall 101 inspecting at least one packet included in the reply to identify a network address therein associated with a high level identification string (step 202). Network firewall 101 may use deep packet inspection (DPI) to retrieve the at least one network address from within the payload of the reply packets. The DPI may be performed within network firewall 101 or network firewall 101 may use another computing system to perform the DPI. The network addresses in the payload of the reply packets are placed there when identification system 103 generates the reply packets after determining which network address(es) correspond to the high level identification string.

Method 200 then provides network firewall 101 updating network address data structure 121 with the identified network address (203). Network address data structure 121 includes network addresses of network traffic that should be allowed to pass through network firewall 101. In some embodiments, network address data structure 121 may include additional information, such as network addresses of network traffic that should be denied by network firewall 101 or network addresses of network traffic that should be handled in some other manner by network firewall 101. Other embodiments may use data structures in addition to network address data structure 121 to store network addresses for which traffic should be handled differently. (e.g., network address data structure 121 may include allowed addresses while another structure includes denied addresses). In some cases, rules may extend beyond simply allowing network addresses received from trusted identification systems. For instance, the rules may define how traffic corresponding to certain high level identification strings should be handled and the network addresses associated with those high level identification strings are treated accordingly.

After network firewall 101 updates network address data structure 121 with the identified network address, method 200 provides network firewall 101 allowing at least one packet from requestor system 102 directed to destination system 104 at the identified network address to traverse network firewall 101 based on network address data structure 121 (204). That is, when network firewall 101 receives packets of network traffic, network firewall 101 identifies the network addresses to which the packets are directed. If a network address is in network address data structure 121, then network firewall 101 allows the network traffic to pass. In this specific example, the at least one packet of network traffic from requestor system 102 is allowed to pass since the network address to which the traffic is directed was added to network address data structure 121 at step 203. Of course, in embodiments where network address data structure 121, or other data structures, indicate network addresses for which network traffic should be handled differently, then network firewall 101 will handle network traffic in accordance with those structures as well.

Advantageously, network firewall 101's reliance on trusted identification systems allows network firewall 101 to handle traffic based on high level identification strings translated by those trusted identification systems rather than network addresses directly. Firewall rules can then be defined based on high level identification strings under the assumption that allowed high level identification strings will be associated with network addresses that should also be allowed when provided by a trusted identification system.

Referring back to FIG. 1, network firewall 101, requestor system 102, identification system 103, and destination system 104 each comprise processing circuitry and a communication interface, or are implemented as virtual machines, containers, hypervisor elements, or otherwise, on one or more host computing systems having at least those components. Elements 101-104 may each further include other components such as a user interface, router, server, data storage system, and power supply. Elements 101-104 may each reside in a single device or may be distributed across multiple devices.

Communication links 111-113 use metal, glass, air, space, or some other material as the transport media, or may comprise virtual links operating on top of such physical link resources. Communication links 111-113 could use various communication protocols, such as Time Division Multiplex (TDM), Internet Protocol (IP), Ethernet, communication signaling, system bus, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), Session Initiation Protocol (SIP), or some other communication format—including combinations thereof. Communication links 111-113 could be direct links or may include intermediate networks, systems, or devices.

Figure 3:
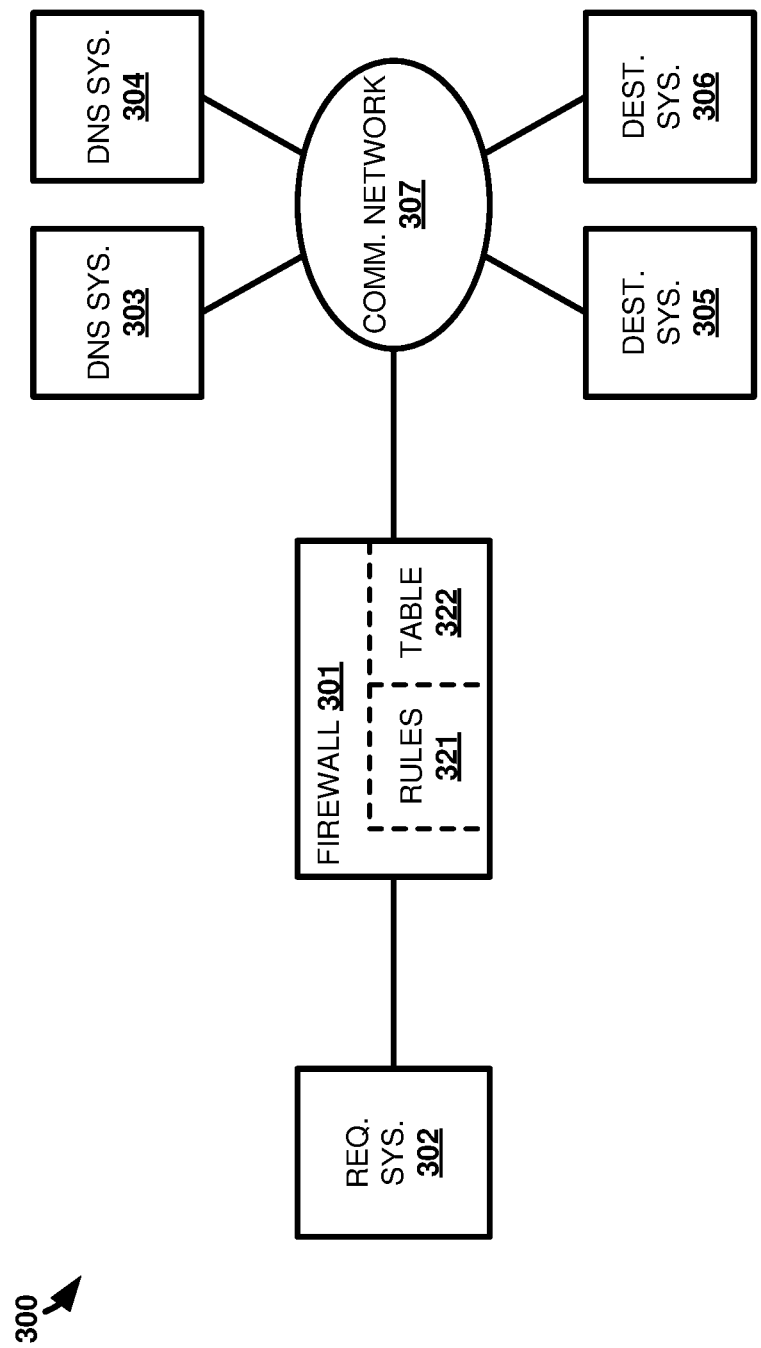
FIG. 3 illustrates another computing environment for firewall policy enforcement based on high level identification strings.

FIG. 3 illustrates computing environment 300 for firewall policy enforcement based on high level identification strings. Computing environment 300 includes network firewall 301, requestor system 302, DNS system 303, DNS system 304, destination system 305, destination system 306, and communication network 307. In some examples, network firewall 301 may be located at the edge of a network (e.g., a local area network (LAN)) of which requestor system 302 is a part, may be implemented in the same computing system as requestor system 302, or may be positioned elsewhere to operate on network traffic exchanged with at least requestor system 302. For instance, if network firewall 301 is co-located on a computing system with requestor system 302, it is possible that one or more of DNS system 303 and DNS system 304 could be located on the same LAN as requestor system 302.

Communication network 307 comprises network elements that provide communications services to at least elements 301-306. Communication network 307 may comprise switches, wireless access nodes, Internet routers, network gateways, application servers, computer systems, communication links, or some other type of communication equipment—including combinations thereof. Communication network 307 may be a single network, such as a local area network, a wide area network, or the Internet, or may be a combination of multiple networks, including virtual networks.

In operation, network firewall 301 uses firewall rules 321 and IP address table 322 to enforce firewall policies with respect to network traffic exchanged with at least requestor system 302. In examples where network firewall 301 protects more than just requestor system 302, the firewall policies may apply to additional systems individually, in groups of systems, or for all systems. In this example, firewall rules 321 include one or more firewall rules that are defined based on high level domain name strings recognizable to DNS systems. Domain name strings commonly take the form of a Uniform Resource Locator (URL), although, domain name strings can be used in other forms. If, for example, an administrator of network firewall 301 does not want traffic being exchanged with systems associated with a particular domain name string, then the administrator will create one or more rules for firewall rules 321 defining that network traffic associated with that domain name string should be denied by network firewall 301. The description below discloses examples of how network firewall 301 may operate to enforce such a rule defined by domain name string.

Figure 4:
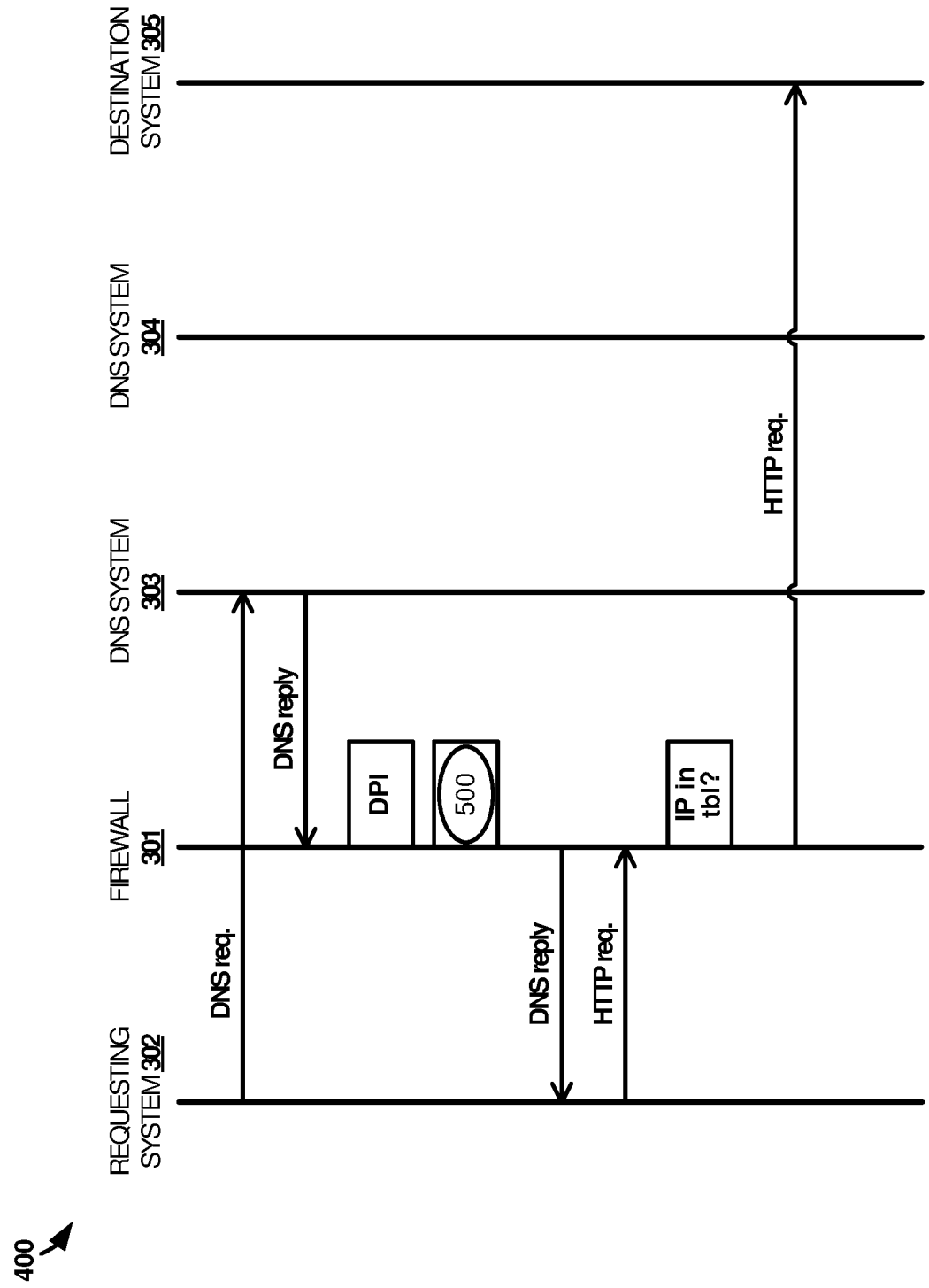
FIG. 4 illustrates an operational scenario of the other computing environment for firewall policy enforcement based on high level identification strings according to one implementation.

FIG. 4 illustrates operational scenario 400 of computing environment 300 for firewall policy enforcement based on high level identification strings according to one implementation. In this example, requestor system 302 transfers a DNS request through network firewall 301 to DNS system 303. The request asks DNS system 303 to provide one or more IP addresses that correspond to a domain name string indicated by the request. For instance, the request may include a URL for a website as the domain name string and DNS system 303 would determine IP addresses being used by one or more systems that serve the website at the time of the request, as those IP addresses may change. DNS system 303 may be used by requestor system 302 instead of DNS system 304 based on user preference, application preference, or for some other reason.

Once DNS system 303 has identified the IP addresses associated with the domain name string provided in the DNS request, DNS system 303 generates a DNS reply that includes those IP addresses and transfers the reply to requestor system 302 by way of network firewall 301. Before network firewall 301 allows the reply to proceed to requestor system 302, network firewall 301 performs deep packet inspection (DPI) on the contents of the DNS reply to identify the IP addresses therein. The DPI allows operational scenario 500 to occur in network firewall 301 with respect to the DNS reply.

Figure 5:
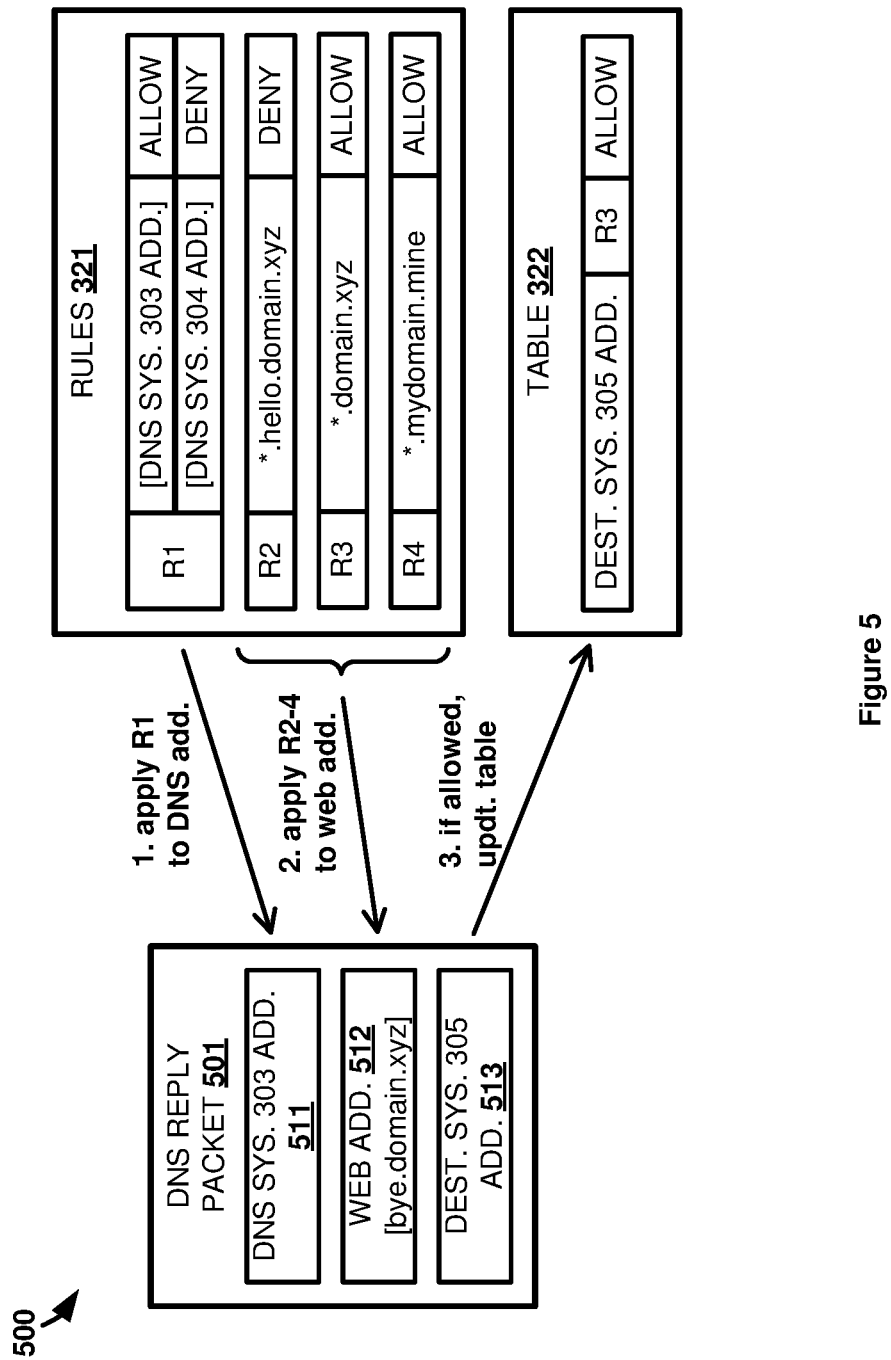
FIG. 5 illustrates an operational scenario of the other computing environment for firewall policy enforcement based on high level identification strings according to the one implementation.

FIG. 5 illustrates operational scenario 500 of computing environment 300 for firewall policy enforcement based on high level identification strings according. In operational scenario 500, the DNS reply described above is represented as a single DNS reply packet 501, although the DNS reply may comprise multiple packets in other examples. DNS reply packet 501 indicates DNS system 303 IP address 511, web address 512, and destination system 305 IP address 513. DNS system 303 IP address 511 may be obtained from packet header information that indicates a source of DNS reply packet 501 or may be identified during DPI along with web address 512 and destination system 305 IP address 513. Web address 512 is the URL for which DNS system 303 identified destination system 305 IP address 513. While this example provides only one IP address for one destination system, in some examples, destination system 305 may have multiple IP addresses and/or the DNS reply may include IP addresses for multiple destination systems.

At step 1 of operational scenario 500, network firewall 301 applies rule R1 of firewall rules 321 to DNS system 303 IP address 511 to determine whether DNS reply packet 501 is received from a trusted DNS system. In this example, DNS system 303 is a trusted DNS system so rule R1 indicates that replies from DNS system 303 should be allowed. In contrast, had DNS reply packet 501 been received from DNS system 304, rule R1 indicates that the reply would be denied, as DNS system 304 is not a trusted DNS system. It should be understood that, in other examples, rule R1 may include any number of allowed or denied DNS systems.

At step 2, rules R2, R3, and R4 are applied by network firewall 301 to web address 512. In this example, the rules are applied sequentially, although, other examples may apply rules in different orders. Rules R2, R3, and R4 are defined by both top-level domains (e.g., 'xyz' in rule R2) and subdomains (e.g., 'hello' and 'domain' in rule R2). The * preceding the addresses in rules R2, R3, and R4 indicates that rules R2, R3, and R4 could apply to any subdomain(s) that may come before the explicitly defined subdomains. In this example, web address 512 is "bye.domain.xyz" and is captured by rule R3. Since rule R3 indicates that applicable addresses should be allowed, network firewall 301 adds destination system 305 IP address 513, which is associated with web address 512 as discovered by DPI, to IP address table 322 as an allowed address at step 3. In examples where more than one IP address is associated with web address 512, each of those addresses would be similarly added to IP address table 322. When adding destination system 305 IP address 513 to IP address table 322, network firewall 301 further notes in IP address table 322 that rule R3 is what led to destination system 305 IP address 513 being entered as allowed into IP address table 322.

In an alternative example, step 2 may determine that a different web address is captured by rule R2. In that example, the IP address(es) corresponding to the different web address in the DNS reply packet may still be added to IP address table 322 as denied addresses under rule R2. Although, those examples may instead maintain a different table for denied addresses or may rely on the fact that any address not in IP address table 322 should be denied.

Referring back to operational scenario 400, once operational scenario 500 has completed, the DNS reply continues onto requestor system 302. Upon receiving the DNS reply, requestor system 302 addresses an HTTP request to destination system 305 IP address 513 to request data (e.g., information to render a website) from destination system 305. The HTTP request first passes through network firewall 301 on its way to destination system 305 and network firewall 301 determines whether the packets that make up the HTTP request are addressed to an allowed IP address by referencing table IP address table 322. In this case, destination system 305 IP address 513 is listed as allowed in IP address table 322 after having been entered during operational scenario 500. Thus, network firewall 301 allows the request to continue to destination system 305. Packets received in response to the HTTP request and additional packets exchanged between requestor system 302 and destination system 305 will similarly be allowed to pass through network firewall 301 based on IP address table 322. Had IP address table 322 not indicated that the IP address of the HTTP request was allowed, then network firewall 301 may have blocked the request from continuing to its destination.

Figure 6:
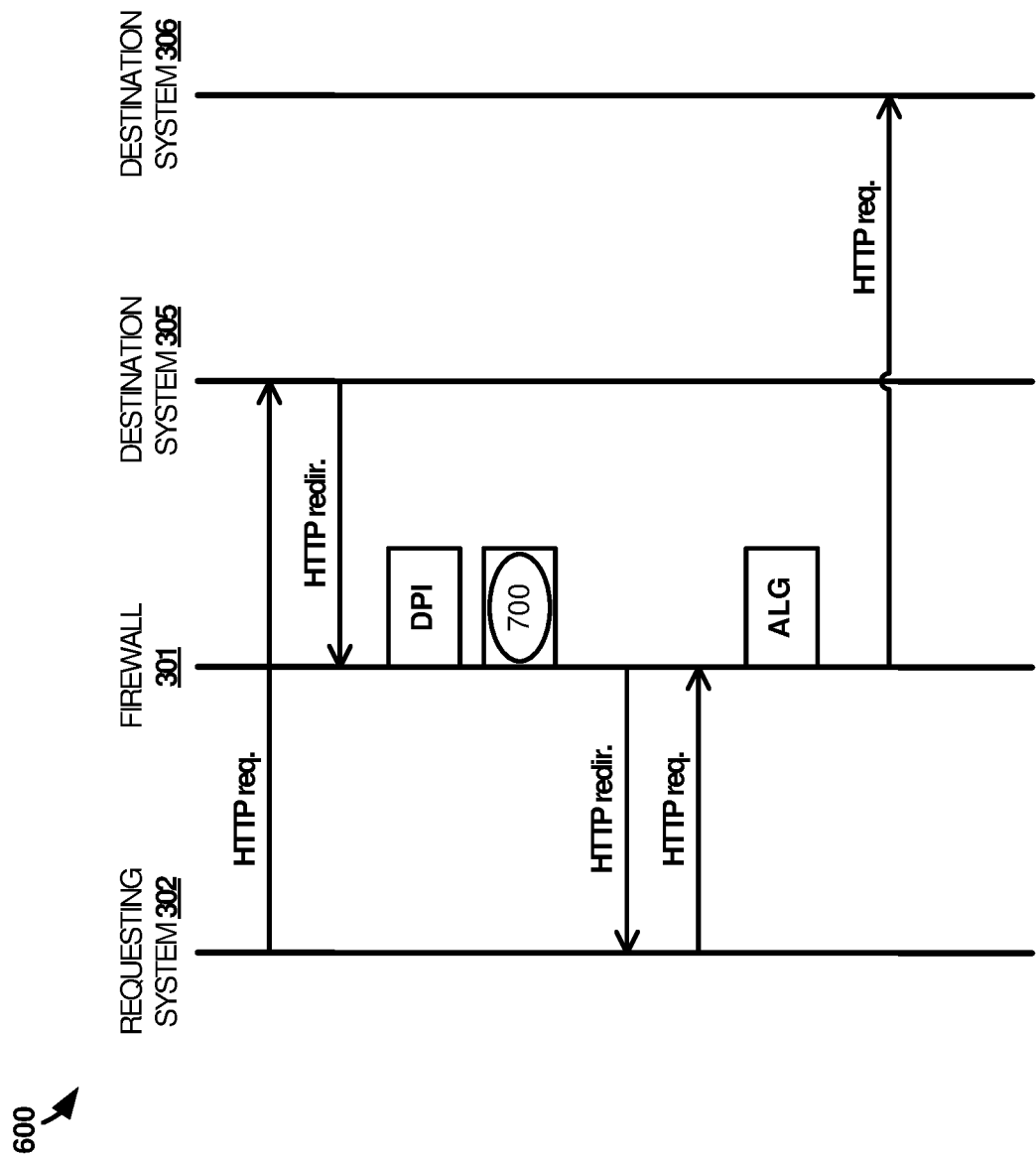
FIG. 6 illustrates another operational scenario of the other computing environment for firewall policy enforcement based on high level identification strings according to another implementation.

FIG. 6 illustrates operational scenario 600 of computing environment 300 for firewall policy enforcement based on high level identification strings according to another implementation. Operational scenario 600 arises from redirects that sometimes occur during HTTP exchanges. If an HTTP session is redirected from a system having an allowed IP address to another system with a different IP address, then that different IP address may lead to network firewall 301 denying network traffic exchanged with that other system if the different IP address was not included in the DNS reply processed in operational scenario 500. Operational scenario 600 therefore overcomes this issue by providing a way for network firewall 301 to allow communications exchanged with a redirected to system.

Operational scenario 600 begins with an HTTP request being sent from requestor system 302 to destination system 305. The HTTP request may be the same request that was sent at the end of operational scenario 400 or may be a subsequent request. Regardless, in this example, destination system 305 responds to the HTTP request with an HTTP redirect message that directs requestor system 302 to communicate with destination system 306 instead of destination system 305. The HTTP redirect message is received by network firewall 301 on its way to requestor system 302. Network firewall 301 recognizes the HTTP redirect message and performs DPI on the request's one or more packets to identify an IP address to which requestor system 302 is being redirected, which is then used with respect to operational scenario 700.

Figure 7:
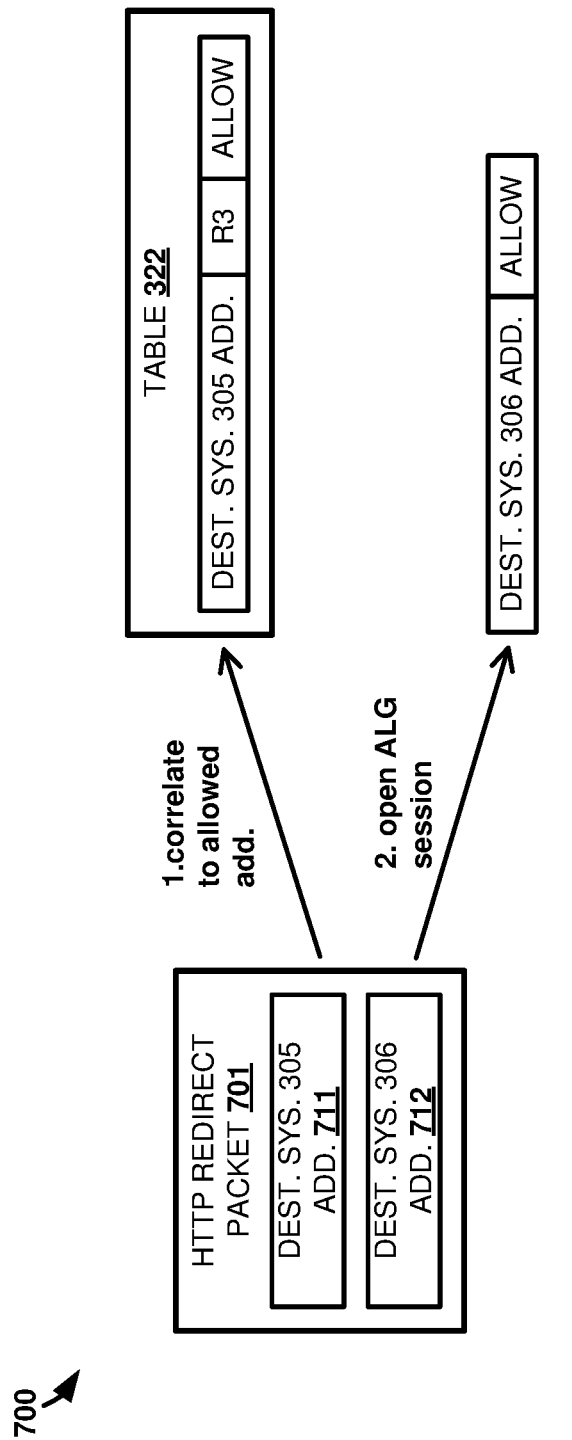
FIG. 7 illustrates an operational scenario of the other computing environment for firewall policy enforcement based on high level identification strings according to the other implementation.

FIG. 7 illustrates operational scenario 700 of computing environment 300 for firewall policy enforcement based on high level identification strings. The HTTP redirect message is represented by a single HTTP redirect packet 701, although the message may include multiple packets in other examples. HTTP redirect packet 701 indicates destination system 305 IP address 711, which may be obtained from packet header information as being the source of HTTP redirect packet 701 or may be obtained from the payload of the packet during DPI along with destination system 306 IP address 712.

At step 1, network firewall 301 determines whether destination system 305 IP address 711 correlates with an allowed IP address in IP address table 322. Essentially, network firewall 301 assumes that a system with an allowed IP address already in IP address table 322 would only redirect to systems that would likewise be allowed. In this example, destination system 305 IP address 711 does correlate with an allowed IP address already in IP address table 322. Accordingly, at step 2, network firewall 301 opens an application-layer gateway (ALG) session through which network traffic between requestor system 302 and destination system 306 can be exchanged. An ALG is a software based security component that augments firewall 301 to allow certain application layer protocols (e.g., HTTP) to work through firewall 301. In particular, the ALG dynamically monitors control traffic for the application layer protocol in order to open necessary ports through firewall 301. The ALG session opened at step 2, accordingly, opens ports through firewall 301 for HTTP traffic exchanged with destination system 306 even though that traffic might otherwise have been denied by firewall 301's rules.

Referring back to operational scenario 600, the HTTP redirect message is allowed to reach requestor system 302. Responsively, requestor system 302 transfers an HTTP request to destination system 306 using destination system 305 IP address 711. The ALG session that network firewall 301 opened previously allows the packets of the HTTP request to pass through network firewall 301 to destination system 306. Any response transferred by destination system 306 back to requestor system 302, along with any subsequent communication exchanges between requestor system 302 and destination system 306 as part of the HTTP session, would similarly pass through network firewall 301 using the opened ALG session.

Figure 8:
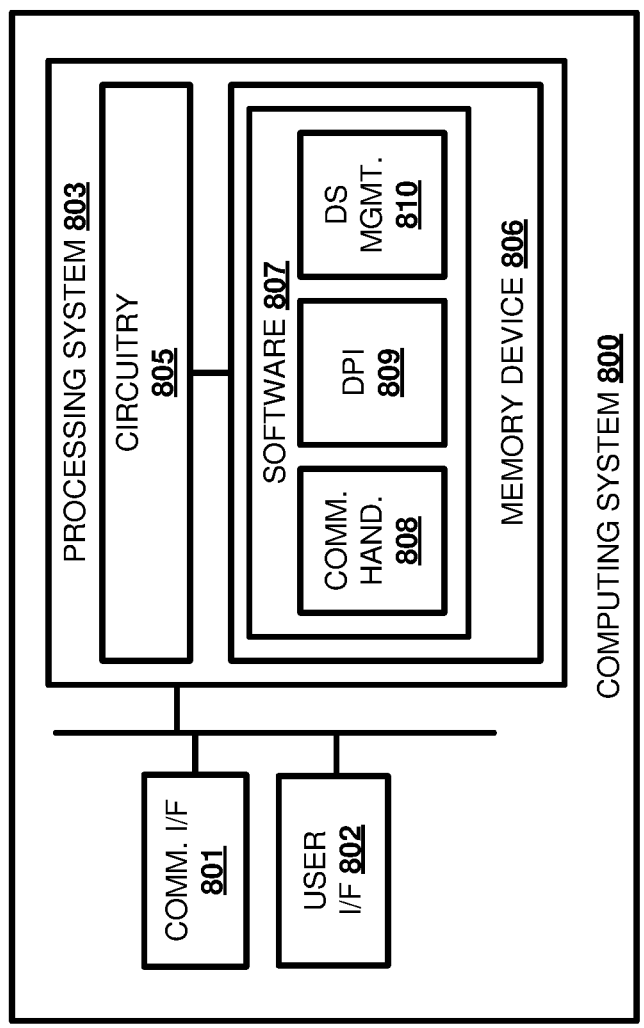
FIG. 8 illustrates a computing architecture used for firewall policy enforcement based on high level identification strings according to one implementation.

FIG. 8 illustrates a computing system 800 for firewall policy enforcement based on high level identification strings according to one implementation. Computing system 800 is representative of any computing system or systems with which the various operational architectures, processes, scenarios, and sequences disclosed herein enable firewall policy enforcement based on high level identification strings. Computing system 800 is an example of a computing system for implementing network firewalls 101 and 301, although other examples may exist. Computing system 800 comprises communication interface 801, user interface 802, and processing system 803. Processing system 803 is linked to communication interface 801 and user interface 802. Processing system 803 includes processing circuitry 805 and memory device 806 that stores operating software 807. Computing system 800 may include other well-known components such as a battery and enclosure that are not shown for clarity.

Communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 may include volatile and nonvolatile, removable and non-removable media implemented in any method or technology for storage of information, such as computer readable instructions, data structures, program modules, or other data. Memory device 806 may be implemented as a single storage device, but may also be implemented across multiple storage devices or sub-systems. Memory device 806 may comprise additional elements, such as a controller to read operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 805 is typically mounted on a circuit board that may also hold memory device 806 and portions of communication interface 801 and user interface 802. Operating software 807 comprises computer programs, firmware, or some other form of machine-readable program instructions. Operating software 807 includes communication handling module 808, DPI module 809, and data structure management module 810, although any number of software modules within the application may provide the same operation. Operating software 807 may further include an operating system, utilities, drivers, network interfaces, applications, or some other type of software. When executed by processing circuitry 805, operating software 807 directs processing system 803 to operate computing system 800 as described herein.

In a particular example, communication handling module 808 directs processing system 803, via communication interface 801, to receive a first reply from a first identification system directed to a requestor system. In response to determining that the first identification system comprises an identification system trusted by the firewall, DPI module 809 directs processing system 803 to inspect at least one packet included in the first reply to identify a first network address therein associated with a first high level identification string. Data structure management module 810 directs processing system 803 to update a data structure comprising allowed network addresses with the first network address. After updating the data structure with the first network address, communication handling module 808 directs processing system 803 to allow at least one packet from the requestor system directed to a first destination at the first network address to traverse the firewall system based on the data structure.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a firewall system based on high level identification strings, the method comprising:
in a firewall system, receiving a first reply from a first identification system directed to a requestor system;

in response to determining that the first identification system comprises an identification system trusted by the firewall, inspecting at least one first packet included in the first reply to identify a first network address therein associated with a first high level identification string;

updating a data structure comprising allowed network addresses with the first network address;

after updating the data structure with the first network address, allowing at least one second packet from the requestor system directed to a first destination at the first network address to traverse the firewall system upon determining that the first network address is in the data structure;

receiving a redirect message from the first destination directed to the requestor system;

inspecting at least one third packet that comprises the redirect message to identify a second network address therein; and allowing at least one fourth packet from the requestor system directed to the second network address to traverse the firewall system.

2. The method of claim 1, wherein allowing the at least one fourth packet comprises:

opening an application-layer gateway session through the firewall system for the at least one fourth packet.

3. The method of claim 1, wherein the redirect message comprises a Hypertext Transfer Protocol (HTTP) redirect message.

4. The method of claim 1, wherein updating the data structure with the first network address comprises:

applying a plurality of rules to the first high level identification string, wherein the rules define whether communications directed to particular identification strings should be allowed;

in response to determining that the first high level identification string satisfies at least one rule of the plurality of rules for allowing communications associated with the first high level identification string, adding the first network address to the data structure.

5. The method of claim 4, further comprising:

indicating the at least one rule in the data structure along with the first network address.

6. The method of claim 1, further comprising:

associating the first network address with the first high level identification string in the data structure.

7. The method of claim 1, further comprising:

receiving a user defined set of trusted identification systems including the first identification system.

8. The method of claim 1, wherein the first identification system comprises a Domain Name System (DNS) and the high level identification string comprises a domain name.

9. The method of claim 1, wherein the firewall system comprises a distributed firewall having distinct instances distributed across a plurality of hypervisors executing on a plurality of host computing systems.

10. A system for implementing a firewall based on high level identification strings, the system comprising:

one or more computer readable storage media;

a processing system operatively coupled with the one or more computer readable storage media; and program instructions stored on the one or more computer readable storage media that, when read and executed by the processing system, direct the processing system to:

receive a first reply from a first identification system directed to a requestor system;

in response to determining that the first identification system comprises an identification system trusted by the firewall, inspect at least one first packet included in the first reply to identify a first network address therein associated with a first high level identification string;

update a data structure comprising allowed network addresses with the first network address;

after updating the data structure with the first network address, allow at least one second packet from the requestor system directed to a first destination at the first network address to traverse the firewall system upon determining that the first network address is in the data structure;

receive a redirect message from the first destination directed to the requestor system;

inspect at least one third packet that comprises the redirect message to identify a second network address therein; and allow at least one fourth packet from the requestor system directed to the second network address to traverse the firewall system.

11. The system of claim 10, wherein to allow the at least one fourth packet, the program instructions direct the processing system to:

open an application-layer gateway session through the firewall system for the at least one fourth packet.

12. The system of claim 10, wherein the redirect message comprises a Hypertext Transfer Protocol (HTTP) redirect message.

13. The system of claim 10, wherein to update the data structure with the first network address, the program instructions direct the processing system to at least:

apply a plurality of rules to the first high level identification string, wherein the rules define whether communications directed to particular identification strings should be allowed; and in response to determining that the first high level identification string satisfies at least one rule of the plurality of rules for allowing communications associated with the first high level identification string, add the first network address to the data structure.

14. The system of claim 13, wherein the program instructions further direct the processing system to:

indicate the at least one rule in the data structure along with the first network address.

15. The system of claim 10, wherein the program instructions further direct the processing system to:

associate the first network address with the first high level identification string in the data structure.

16. The system of claim 10, wherein the program instructions further direct the processing system to:

receive a user defined set of trusted identification systems including the first identification system.

17. The system of claim 10, wherein the first identification system comprises a Domain Name System (DNS) and the high level identification string comprises a domain name.

18. The system of claim 10, wherein the firewall system comprises a distributed firewall having distinct instances distributed across a plurality of hypervisors executing on a plurality of host computing systems.

* * * * *